United States Patent
Luo et al.

(10) Patent No.: US 11,846,005 B2
(45) Date of Patent: Dec. 19, 2023

(54) BINDER COMPOSITIONS AND PROCESSES OF PREPARING IRON ORE PELLETS

(71) Applicant: Kemira Oyj, Helsinki (FI)

(72) Inventors: Yuping Luo, Atlanta, GA (US); Lucas Moore, Atlanta, GA (US); Patrick Macy, Atlanta, GA (US)

(73) Assignee: Kemira Oyj, Helsinki (FI)

( * ) Notice: Subject to any disclaimer, the term of this patent is extended or adjusted under 35 U.S.C. 154(b) by 560 days.

(21) Appl. No.: 15/520,893

(22) PCT Filed: Nov. 10, 2015

(86) PCT No.: PCT/US2015/059996
§ 371 (c)(1),
(2) Date: Apr. 21, 2017

(87) PCT Pub. No.: WO2016/077374
PCT Pub. Date: May 19, 2016

(65) Prior Publication Data
US 2018/0023167 A1    Jan. 25, 2018

Related U.S. Application Data

(60) Provisional application No. 62/077,510, filed on Nov. 10, 2014.

(51) Int. Cl.
| C22B 1/14 | (2006.01) |
| C22B 1/244 | (2006.01) |
| B22F 1/102 | (2022.01) |
| B22F 3/06 | (2006.01) |
| C08L 3/02 | (2006.01) |
| C08L 33/26 | (2006.01) |

(52) U.S. Cl.
CPC .............. *C22B 1/244* (2013.01); *B22F 1/102* (2022.01); *B22F 3/06* (2013.01); *C08L 3/02* (2013.01); *C08L 33/26* (2013.01)

(58) Field of Classification Search
CPC ........... C22B 1/244; C22B 1/08; C22B 1/242; C22B 1/00; C08L 3/00; C08L 3/02; C08L 33/00; C08L 33/26; B22F 1/0062; B22F 3/06; B22F 1/102
See application file for complete search history.

(56) References Cited

U.S. PATENT DOCUMENTS

| | | | | |
|---|---|---|---|---|
| 3,644,113 A | * | 2/1972 | Lang | ...................... C08F 251/00 |
| | | | | 426/285 |
| 4,684,549 A | * | 8/1987 | Allen | ...................... C22B 1/244 |
| | | | | 148/105 |
| 4,728,537 A | | 3/1988 | Allen et al. | |
| 4,751,259 A | | 6/1988 | Roe | |
| 4,767,449 A | * | 8/1988 | Rosen | ................... C22B 1/2406 |
| | | | | 75/321 |
| 4,802,914 A | | 2/1989 | Rosen et al. | |
| 5,112,391 A | * | 5/1992 | Owen | ...................... C22B 1/244 |
| | | | | 75/313 |
| 5,171,361 A | * | 12/1992 | Dingeman | ............... C22B 1/244 |
| | | | | 75/321 |
| 5,171,781 A | | 12/1992 | Farrar et al. | |
| 5,306,327 A | * | 4/1994 | Dingeman | ............... C22B 1/244 |
| | | | | 75/303 |
| 6,152,985 A | | 11/2000 | Allen | |
| 7,285,586 B2 | * | 10/2007 | Helbling | .............. C09D 103/04 |
| | | | | 106/206.1 |
| 2002/0035188 A1 | | 3/2002 | Steghs et al. | |
| 2014/0033872 A1 | * | 2/2014 | Martikainen | .......... C22B 1/2406 |
| | | | | 75/767 |

OTHER PUBLICATIONS

CN101985689, machine translation, published May 2012.*
Ecologix Enviornmental System—Mesh to Micron Conversion table, 2022.*
Industrial Specialities Mfg. (ISM) and Is MED Specialties, Mesh and Micron Sizes, 2020.*
Supplementary European Search Report for European Patent Application No. 158582635, dated Mar. 15 , 2018.
International Search Report from PCT/US2015/059996, dated Jan. 5, 2016.

* cited by examiner

*Primary Examiner* — Smita S Patel
(74) *Attorney, Agent, or Firm* — Robin L. Teskin; Baker, Donelson, Bearman, Caldwell & Berkowitz PC

(57) ABSTRACT

Binder compositions for agglomerating iron ore fines are provided, the compositions comprising: one or more types of modified starch and one or more types of synthetic dry polymers. A process for preparing iron ore pellets with the binder compositions is also provided, the process comprising: (i) adding a binder composition to particulate iron ore to form a mixture; and (ii) forming the mixture into pellets.

10 Claims, No Drawings

BINDER COMPOSITIONS AND PROCESSES OF PREPARING IRON ORE PELLETS

CROSS REFERENCE TO RELATED APPLICATIONS

This application is a national stage application under 35 U.S.C. § 371 of International Application No. PCT/US2015/059996, filed Nov. 10, 2015, which claims priority to U.S. Provisional Patent Application No. 62/077,510, filed Nov. 10, 2014. The complete disclosure of each of the above-identified applications is fully incorporated herein by reference.

FIELD OF THE ART

The present disclosure generally relates to binder compositions for preparing iron ore pellets and processes for preparing the iron ore pellets.

BACKGROUND

Iron ore is commonly used in the production of steel. In the first step of the steel-making process, iron is recovered from the ore by smelting in a blast furnace. To be fed directly into the furnace, to the iron ore must be in the form of agglomerates of substantial size. If the ore is in the form of particles that are too small for direct feed, it is necessary to convert the iron ore particles to a sinter or to pellets. With the increasing use of lower grade ores, it has become necessary to grind the ore more finely. For these fine particles, pelletization is a common method of feedstock production for the furnaces.

Binders may be used to pelletize particulate iron ore particles. Generally, the iron ore pellets are formed by adding binder or a binder composition to the fine particulate ore and stirring in the presence of a small amount of water to form a moist mixture, and then pelletizing the mixture to form green (wet) pellets. These green pellets are then fired in a kiln through a temperature range that extends from an inlet temperature typically in the range 200°-400° C. to a final temperature of e.g., 1200° C. Such processes of forming iron ore pellets are described, for example, in European Patent No. 0225171, which is incorporated herein by reference in its entirety.

Common binders used to agglomerate particulate iron ore include certain polymers and bentonite, although other binders have been proposed in the literature, for example various clays, ferrous sulphate, lignin sulphate, asphalt, starches, calcium and sodium compounds.

BRIEF SUMMARY

In view of the foregoing, one or more exemplary embodiments are directed to binder compositions for agglomerating iron ore fines comprising: one or more types of modified starch one or more types of synthetic dry polymer. Also disclosed is a process for preparing iron ore pellets with the binder compositions, the process comprising: (i) adding a binder composition to particulate iron ore to form a mixture; and (ii) forming the mixture into pellets. The exemplary binder compositions are economical and readily-processed.

The disclosure may be understood more readily by reference to the following detailed description of the various features of the disclosure and the examples included therein.

DETAILED DESCRIPTION

Generally, the present disclosure is directed to binder compositions for agglomerating iron ore fines, and processes for preparing iron ore pellets. According to the exemplary embodiments, the binder composition includes one or more types of modified starches and one or more types of synthetic dry polymers. The binder composition may further comprise, or be combined with, one or more alkaline materials, such as sodium carbonate, ash or another caustic material. The binder compositions and processes described herein can be used to provide iron ore pellets that have improved properties, including, but not limited to, dry strength and high temperature strength. In certain embodiments, the binder compositions offer economic advantages over other polymer-based binder compositions and performance advantages over other polymer-based or starch-based binder compositions.

As used herein, the phrase "iron ore fines" refers to substantially iron-based or iron ore materials that are in particulate form. In exemplary embodiments, the iron ore fines are particles of iron ore that are substantially of small particle size, for example less than about 250 μm. Iron ores are rocks and minerals from which metallic iron can be economically extracted. The ores are usually rich in iron oxides and vary in color from dark grey, bright yellow, deep purple, to rusty red. The iron itself is usually found in the form of magnetite ($Fe_3O_4$), hematite ($Fe_2O_3$), goethite (FeO(OH)), limonite ($FeO(OH) \cdot n(H_2O)$) or siderite ($FeCO_3$). Taconite is an iron-bearing sedimentary rock in which the iron minerals are interlayered with quartz, chert, or carbonate. Itabirite, also known as banded-quartz hematite and hematite schist, is an iron and quartz formation in which the iron is present as thin layers of hematite, magnetite, or martite. Any of these types of iron are suitable for use in forming the pellet as described herein. In exemplary embodiments, the iron ore fines are substantially magnetite, hematite, taconite or itabirite. In exemplary embodiments, the iron ore fines can be contaminated with clay.

As used herein, the term "pellet" refers to a small particle created by agglomerating the mixture comprising iron ore fines, the binder and a liquid, such as water. Such mixtures may also be agglomerated or compressed into shapes other than pellets, for example briquettes or other appropriate shapes. As will be understood by those of skill in the art, the shape of the agglomerated particle is not particularly limited. In exemplary embodiments, the final particle size of the pellet, or agglomerated particle, is about 5 to about 19 mm.

As used herein, the term "binder" or "binder composition" refers to a composition or a system of components that is added to the iron ore fines in order to draw them together in such a way that the mixture maintains a uniform consistency. The binder composition may be added to the iron ore fines as a mixture of the components or the components of the binder composition may be added separately to the iron ore composition and in any order deemed suitable by one of skill in the art. In exemplary embodiments, the binder composition is a dry mixture or is a substantially dry mixture.

In exemplary embodiments, the binder composition comprises (i) one or more types of modified starch and (ii) one or more types of synthetic dry polymer. The optimal proportions of these components may vary depending on the identity of each of the components, the source of iron ore fines, the moisture content, the surface area, the particle size and the impurities.

In exemplary embodiments, the binder composition comprises about 5 to about 50%, about 20 to about 50%, or about 30 to about 50% by weight one or more types of modified starch. In exemplary embodiments, the binder composition comprises: at least about 5%, about 10%, about 15%, about 20%, about 25%, about 30%, about 35%, about 40%, about 45%, or about 50% by weight one or more types of modified starch.

In exemplary embodiments, the binder composition comprises about 50 to about 95%, about 50 to about 80%, or about 50 to about 70% by weight one or more types of synthetic dry polymer. In exemplary embodiments, the binder composition comprises: at least about 50%, about 55%, about 60%, about 65%, about 70%, about 75%, about 80%, about 85%, about 90%, or about 95% by weight one or more types of modified synthetic dry polymer.

In exemplary embodiments, the binder composition comprises: (a) about 5 to about 50% by weight one or more types of modified starch and; (b) about 50 to about 95% by weight one or more types of synthetic dry polymer. In exemplary embodiments, the binder composition comprises: (a) about 20 to about 50% by weight one or more types of modified starch and; (b) about 50 to about 80% by weight one or more types of synthetic dry polymer. In other exemplary embodiments, the binder composition comprises: (a) about 20 to about 30% by weight one or more types of modified starch and; (b) about 70 to about 80% by weight one or more types of synthetic dry polymer. In a specific embodiment, the binder composition comprises: (a) about 25% by weight one or more types of modified starch and; (b) about 75% by weight one or more types of synthetic dry polymer. In other exemplary embodiments, the binder composition comprises: (a) about 30 to about 50% by weight one or more types of modified starch and; (b) about 50 to about 70% by weight one or more types of synthetic dry polymer. In a specific embodiment, the binder composition comprises: (a) about 50% by weight one or more types of modified starch and; (b) about 50% by weight one or more types of synthetic dry polymer.

In exemplary embodiment, the starch is "modified" by gelatinization. In exemplary embodiments, the starch is at least partially gelatinized. In exemplary embodiments, starch is gelatinized by heating a starch-water mixture to a temperature exceeding the temperature at which the quasi-crystalline or aggregate structure of the water-swollen starch granules are irreversibly destroyed. Optionally, a hydrolytic agent is added to the starch-water mixture. In exemplary embodiments, the modified starch is a fully or partially gelatinized starch or a gelled starch, such as gelled corn starch.

The starch may be any suitable starch. In exemplary embodiments, the starch is from corn, wheat, potato (or other tuber), rice, triticale or cassava.

In exemplary embodiments, both the starch and the synthetic dry polymer are provided in the form of particles having a size ratio ranging from about 1:0.5 to about 1:10 (starch:polymer). In exemplary embodiment, the size ratio of the starch particles to the polymer particles is about 1:0.5, about 1:1, about 1:2, about 1:3, about 1:4, about 1:5, about 1:6, about 1:7, about 1:8, about 1:9, or about 1:10.

In exemplary embodiments, the modified starch particles and the synthetic dry polymer particles are of substantially similar sizes. In certain exemplary embodiments, both the starch and the synthetic dry polymer are provided in the form of particles having a size ratio ranging from about 1:0.5 to about 1:1.5 (starch:polymer). In exemplary embodiment, the size ratio of the starch particles to the polymer particles is about 1:0.5, about 1:0.6, about 1:0.7, about 1:0.8, about 1:0.9, about 1:1, about 1:1.1, about 1:1.2, about 1:1.3, about 1:1.4 or about 1:1.5.

In exemplary embodiments, the starch is provided in the form of particles having a median particle size of about 50 to about 250 microns, or more particularly, about 50 to about 80 microns, about 70 to about 90 microns, about 80 to about 105 microns, about 90 to about 120, or about 120 to about 150 microns. In exemplary embodiments, the starch is provided in the form of particles having a median size of about 50, about 55, about 60, about 65, about 70, about 75, about 80, about 85, about 90, about 95, about 100, about 105, about 110, about 115, about 120, about 125, about 130, about 135, about 140, about 145 or about 150 microns or more. In exemplary embodiments, substantially all, or at least 90% by weight, of the individual starch particles are in the range of about 50 to about 250 microns, or more particularly, about 50 to about 80 microns, about 70 to about 90 microns, about 90 to about 120, or about 120 to about 150 microns.

In exemplary embodiments, the anionic synthetic dry polymer can be introduced to the binder composition as a powder or as a dispersion, for example a dispersion of the polymer in powder form in oil. In exemplary embodiments, both the starch and the polymer are provided as particles having a size ratio of between about 1:0.5 to about 1:10 (starch:polymer), as discussed above. In exemplary embodiments, particles of the synthetic dry polymer have a median size of between about 50 to about 800 microns, about 50 to about 300 microns, about 100 to about 800 microns, about 100 to about 300 microns, about 50 to about 250 microns, about 50 to about 80 microns, about 70 to about 90 microns, about 80 to about 105 microns, about 90 to about 120, or about 120 to about 150 microns. In exemplary embodiments, the synthetic dry polymer is provided in the form of particles having a median size of about 50, about 60, about 70, about 80, about 90, about 100, about 110, about 120, about 130, about 140, about 150, about 250, about 300, about 700, microns or more. In exemplary embodiments, at least about 80% by weight, of the individual polymer particles are in the range of about 50 to about 800 microns, about 50 to about 300 microns, about 50 to about 250 microns or about 50 to about 150 microns. In exemplary embodiments, substantially all, or at least 90% by weight, of the individual polymer particles are in the range of about 50 to about 800 microns, about 50 to about 300 microns, about 50 to about 250 microns, about 50 to about 150 microns, about 50 to about 80 microns, about 70 to about 90 microns, about 80 to about 105 microns, about 90 to about 120, or about 120 to about 150 microns. These individual synthetic dry polymer particles may be introduced into the mixture as friable aggregates of several particles, these aggregates breaking down into the individual particles during mixing with the insoluble particulate material. In exemplary embodiments, substantially all, or at least 95% by weight, of the individual polymer particles are in the range of about 50 to about 800 microns, and the average particle size is about 700 microns.

In exemplary embodiments, the synthetic dry polymer is charged or neutral. In exemplary embodiments, the synthetic dry polymer may comprise nonionic, anionic or cationic monomers. In exemplary embodiments, the synthetic dry polymer is anionic or has a net anionic charge. In exemplary embodiments, the synthetic dry polymer is neutral or has a net neutral charge. In exemplary embodiments, the synthetic dry polymer comprises nonionic monomers and anionic monomers and has a net anionic charge. In exemplary embodiments, the synthetic dry polymer comprises cationic monomers and anionic monomers and has a net neutral or anionic charge. In exemplary embodiments, the synthetic dry polymer has about 10 to about 40 mole % anionic charge, or more particularly, about 5 to about 15 mole % anionic charge. In exemplary embodiments, the polymer contains at least about 5%, about 10%, or about 15% by weight anionic monomers. In exemplary embodiments, the anionic monomer is acrylic acid, methacrylic acid, sulphonic acid, an ethylenically unsaturated carboxylic acid, a mixture thereof, or salts thereof. The anionic monomer may be used in the form of a salt, for example a water soluble salt such as a sodium salt, a potassium salt, or an ammonium salt. The anionic monomer may be used partially or wholly in the form of free acid.

In exemplary embodiments, the synthetic dry polymer is an acrylamide-containing polymer. In exemplary embodiments, the acrylamide-containing polymer is a polyacrylamide or a copolymer including acrylamide monomers, for example a copolymer of acrylamide and acrylic acid. In exemplary embodiments, the ratio of the weight percent of acrylamide monomers to the weight percent of other monomers in the synthetic dry polymer is in the range of about 90:10 to about 10:90; about 90:10 to about 40:60; about 90:10 to about 70:30; or about 85:15 to about 75:25. In exemplary embodiments, the synthetic dry polymer is a copolymer of acrylamide and acrylic acid. In exemplary embodiments, the copolymer of acrylamide and acrylic acid has a mole ratio of acrylic acid:acrylamide is about 15:100.

In exemplary embodiments, the synthetic dry polymer has a molecular weight range from about 20 to about 25,000,000 dalton. In exemplary embodiment, the molecular weight is from about 20 to about 1,000, about 1,000 to about 5,000, about 5,000 to about 10,000, about 10,000 to about 25,000, about 25,000 to about 50,000, about 50,000 to about 100,000, about 100,000 to about 250,000, about 250,000 to about 500,000, about 500,000 to about 1,000,000, about 1,000,000 to about 250,000, about 250,000 to about 500,000, about 500,000 to about 1,000,000, about 1,000,000 to about 5,000,000, about 5,000,000 to about 10,000,000 about 10,000,000 to about 15,000,000, about 15,000,000 to about 20,000,000, about 20,000,000 to about 25,000,000.

In exemplary embodiments, the synthetic dry polymer has an average specific viscosity of about 2.5 to about 6.5 cPs, about 2.5 cPs to about 6.1, about 2.5 cPs to about 3.5, or about 4.5 to about 6.1 cPs. In exemplary embodiments, the synthetic dry polymer has an average specific viscosity of about 2.9.

In exemplary embodiments, the acrylamide-containing polymer is a copolymer of acrylamide and acrylic acid, for example a polymer having a mole ratio greater than about 5:95 acrylic acid:acrylamide. In exemplary embodiments, the copolymer of acrylamide and acrylic acid has a mole ratio of about 5:95, about 10:90, about 15:85, about 20:80, about 25:75, about 30:70, about 35:65 or about 40:60 acrylic acid:acrylamide. In exemplary embodiments, the copolymer of acrylamide and acrylic acid has a mole ratio in the range of about 5:95 to about 40:60 acrylic acid:acrylamide. In exemplary embodiments, the acrylamide-containing polymer is a copolymer of acrylamide and acrylic acid, for example a polymer having a mole ratio of about 5:95 acrylic acid:acrylamide, about 30:70 acrylic acid:acrylamide, about 18.5:81.5 acrylic acid:acrylamide, or about 22.7:100 acrylic acid:acrylamide.

In exemplary embodiments, the polymer is linear. In exemplary embodiments, the polymer structure may include branched polymers, star polymers, comb polymers, crosslinked polymers, or combinations thereof.

As used herein, the terms "polymer," "polymers," "polymeric," and similar terms are used in their ordinary sense as understood by one skilled in the art, and thus may be used herein to refer to or describe a large molecule (or group of such molecules) that contains recurring units. Polymers may be formed in various ways, including by polymerizing monomers and/or by chemically modifying one or more recurring units of a precursor polymer. A polymer may be a "homopolymer" comprising substantially identical recurring units formed by, e.g., polymerizing a particular monomer. A polymer may also be a "copolymer" comprising two or more different recurring units formed by, e.g., copolymerizing two or more different monomers, and/or by chemically modifying one or more recurring units of a precursor polymer. The term "terpolymer" may be used herein to refer to polymers containing three or more different recurring units.

In exemplary embodiments, the synthetic dry polymer is made by polymerization in conventional manner or known in the art, such as reverse phase polymerization followed by drying and, optionally, comminution; or by bulk gel polymerization followed by drying and comminution. If the polymers are made by comminution it may be necessary to sieve the particles to give desired particle size. In certain embodiments, the anionic synthetic dry polymer is in the form of beads, for example substantially spherical beads, made by reverse phase polymerization. In certain embodiments, the synthetic dry polymer is a free-flowing powder.

In exemplary embodiments, the proportions of the starch and synthetic dry polymer are adjusted based on the hardness of the iron ore. Generally, proportionately more of the synthetic dry polymer is used as the hardness of the iron ore increases.

In exemplary embodiments, the binder composition comprises about 20 to about 30% gelled corn starch and about 70 to about 80% a copolymer of acrylamide and acrylic acid.

In exemplary embodiments, the binder composition comprises about 20 to about 50% gelled corn starch and about 50 to about 80% a copolymer of acrylamide and acrylic acid, wherein at least about 80% of the starch and polymer particles are present as particles having a size ratio in the range of about 1:1 to about 1:10.

In exemplary embodiments, the binder composition comprises about 20 to about 30% gelled corn starch and about 70 to about 80% a copolymer of acrylamide and acrylic acid, wherein the starch and polymer are present as particles having a median size of about 80 to about 100 microns.

In exemplary embodiments, the binder composition comprises about 30 to about 50% gelled corn starch and about 50 to about 70% a copolymer of acrylamide and acrylic acid.

In exemplary embodiments, the binder composition comprises about 30 to about 50% gelled corn starch and about 50 to about 70% a copolymer of acrylamide and acrylic acid, wherein the starch and polymer are present as particles having a median size of about 80 to about 100 microns.

In exemplary embodiments, the binder composition may be added to iron ore fines to provide a pellet. In exemplary embodiments, the pellet comprises about 0.005 to about 0.2%, about 0.01 to about 0.1%, about 0.02 to about 0.08%, or about 0.03 to about 0.06% binder composition per kilogram of iron ore fines. In a specific embodiment, the pellets comprise about 0.05% binder composition per kilogram of iron ore fines.

In exemplary embodiments, the binder composition further comprises one or more alkaline materials, such as sodium carbonate, ash or another caustic material. In exemplary embodiments, the binder composition comprises a starch and synthetic dry polymer component and an alkaline materials component. The starch and synthetic dry polymers component includes about 5 to about 50% starch and about 50 to about 95% synthetic dry polymer. In certain embodiments, the alkaline materials component includes about 100% sodium carbonate and/or soda ash. In exemplary embodiments, the ratio of the starch and synthetic dry polymers component to the alkaline materials component is in the range of about 100:0 to about 50:50; or about 70:30 to about 50:50.

In exemplary embodiments, the binder composition comprises about about 5 to about 50%, about 10 to about 50%, about 20 to about 50%, about 30 to about 50%, or about 40 to about 50%, by weight one or more types of alkaline materials. In exemplary embodiments, the binder composition comprises: at least about 5%, about 10%, about 15%, about 20%, about 25%, about 30%, about 35%, about 40%, or about 45% by weight one or more types of alkaline materials. In exemplary embodiments, the binder composition does not comprise alkaline materials.

Pellets

Pellets that include the exemplary binder composition have improved properties. Common properties of the pellets include the initial or wet strength, the dry strength (after drying the green pellets in an oven at 105° C.) and the tendency of the pellets to spall (or burst) upon exposure to firing temperatures. Generally, a higher spalling temperature is a desirable quality. The tendency for spalling can be defined by determining the minimum temperature at which spalling occurs or by observing the percentage of fines formed during a particular firing cycle. Other properties of the pellets include the moisture content of the mixture and the porosity of the pellets. Another property of pellets is a "drop number." Generally, a high drop number for the green pellets is desirable. To ensure uniform properties, the binder's flow properties must be such that it can easily be added uniformly in low quantities.

In exemplary embodiments, the pellets comprising a mixture of iron ore fines and the binder compositions described herein have satisfactorily dry strength, satisfactory drop number and satisfactorily high temperature strength, such as when compared to similar pellets made with a dry polyacrylamide binder. In exemplary embodiments, the pellets comprising a mixture of iron ore fines and the binder compositions described herein have desirable surface properties; e.g. smoothness. Generally, pellets with a smoother surface generate less dust.

In other exemplary embodiments, the pellets comprising a mixture of iron ore fines and the binder compositions described herein, have satisfactorily wet strength, satisfactory dry strength, satisfactory drop number and satisfactorily high temperature strength, such as when compared to similar pellets made with a dry polyacrylamide binder.

Overall, the binder compositions exhibit synergistic effects in terms of dry strength and high temperature strength over single component organic binders, such as polymer-based binders or starch-based binders.

In exemplary embodiments, the deformation of the pellets is low. In exemplary embodiments, the deformation is about 12%, about 11%, about 10%, about 9%, about 8%, about 7%, about 6%, about 5%, or about 4% or less. In exemplary embodiments, the deformation is in the range of about 4% to about 12%, or about 6% to about 11%.

Processes for Preparing Pellets

In exemplary embodiments, a process for preparing pellets of iron ore comprising: (i) adding a binder composition to iron ore fines to form a mixture; and (ii) forming the mixture into pellets. In exemplary embodiments, the binder composition comprises: one or more types of modified starch one or more types of synthetic dry polymer, and optionally, one or more types of alkaline materials. In exemplary embodiments, the binder composition comprises: (a) about 5 to about 50% by weight one or more types of modified starch and; (b) about 50 to about 95% by weight one or more types of synthetic dry polymer. In exemplary embodiments, the binder composition consists essentially of one or more types of modified starch one or more types of synthetic dry polymer. In exemplary embodiments, the binder composition comprises: one or more types of modified starch one or more types of synthetic dry polymer, and one or more types of alkaline materials, wherein the ratio of the amount of modified starch and synthetic dry polymers component to the amount of alkaline materials component is in the range of about 100:0 to about 50:50; or about 70:30 to about 50:50.

According to the embodiments, the binder composition comprises: (a) about 20 to about 50% of at least one modified starch and (b) about 50 to about 80% of at least one synthetic dry polymers. In certain embodiments, the synthetic dry polymer is anionic, or more particularly, about 10 to about 40 mole % charge, or about 5 to about 15 mole % charge.

In exemplary embodiments, the components of the binder composition may be blended and added to the iron ore fines as a blend. In certain embodiments, the components of the binder may be added separately to the iron ore fines.

According to the embodiments, the process steps of adding the binder composition to iron ore fines to form a mixture or forming the mixture into pellets can be carried out in the conventional or known methods in the art of agglomeration. In exemplary embodiments, the process further comprises the step of mixing, stirring or agitating the mixture after the addition of the binder composition. In certain embodiments, the binder composition may be added to the iron ore fines prior to or during mixing of the mixture. In exemplary embodiments, the binder composition can be blended with the iron ore fines by scattering the binder composition powder or dispersion on to the iron ore fines as it is carried toward a mixer, such as a paddle mixer with stators. In exemplary embodiments, the mixture comprising the iron ore fines and the binder composition is mixed for about 2 minutes to about 20 minutes.

In exemplary embodiments, the process further comprises the step of adding water, which may be added before, during or after the addition of the binder to the iron ore fines. The amount of water added is the amount required to bring the moisture content to the optimum level for the particular mixture. In exemplary embodiments, the iron ore fines, prior to adding the binder composition, already has the desired final moisture content of about 5 to about 15%, or about 6 to about 10%, by weight based on the weight of the iron ore. The moisture content is the moisture as measured by heating up to about 105° C. If the iron ore fines initially do not contain the desired final moisture content, water may be added to increase the moisture content.

In exemplary embodiments, the forming of the mixture into pellets, or the agglomeration step, may be conducted with or without compression, by balling on a disc, or balling in a drum. In exemplary embodiments, the process may further comprise drying and firing the pellets, for example by any methods known in the art such as heating the pellets to about 1000° C., about 1200° C. For this purpose, the pellets can be introduced to a kiln or other firing apparatus and fired in the conventional manner. It is desirable to be able to introduce them into this furnace at the highest possible inlet temperature with the minimum risk of spalling. The inlet temperature at which spalling becomes significant can be referred to as the spalling temperature and a particular advantage of the embodiments is that it is possible to make pellets having a spalling temperature higher than can conveniently be obtained by the use of bentonite and other known binders.

The following examples are presented for illustrative purposes only, and are not intended to be limiting.

EXAMPLES

The pellet preparation and testing methods used throughout the Examples described herein are provided below.

Pellet Preparation

In this example, iron ore pellets comprising iron ore and a binder, including binders according to the embodiments described herein, were prepared. The iron ore used in this example was Magnetite with a moisture content of between 8 to 11 wt. %. The control binder composition was 60% anionic dry acrylamide and acrylic acid copolymer (18.4 mol % acrylic acid) with an optimum particle size of 100 micron and 40% $Na_2CO_3$. The binder compositions according the embodiments contained 60% of a starch-polymer blend (50% by weight of at least one modified starch and about 50% by weight of anionic synthetic dry polymer) and 40% $Na_2CO_3$. The Sample A binder composition contained a starch-polymer blend of about 50% by weight gelled corn starch with a median particle size of about 80 micron (available from Tate & Lyle) and about 50% by weight 18.5:81.5 acrylic acid:acrylamide dry polymer with a median particle size of about 100 micron (available from Kemira Chemicals). The viscosity of the starch-polymer blend was 2.9 cPs. The binder was added to the iron ore at a dosage of 0.05 weight-percent. This mixture was initially mixed by hand and then loaded into a high speed mixer (manufactured by WAM S.p.A Italy) and mixed for about 1 minute at 100 rpm minute. After mixing, the batch was screened to remove large lumps and particles.

A disc pelletizer (disc diameter 0.40 m; manufactured by MarsMinerals USA) was used to prepare pellets from the mixture. The mixture was fed with constant rate to the disc and atomized water was sprayed to disc to assist the pellet formation. Pellets grown to right size range (larger than 10 mm) were constantly removed during the pelletization process. After the pelletization, the whole produced pellet batch was sieved to different size fraction and all analyses work was done with 10-12.5 mm pellet size fraction. All strength testing was done with 10-12.5 mm pellets. Tumbling index was done with a mixture of pellets of all size fractions ranging from 8 to 15 mm.

The pellets comprising the exemplary binder composition were found to have good processability and minimal stickiness.

Analysis of Physical Properties

Pellets made with each binder composition were evaluated to determine certain physical properties.

The Drop Number was determined by repeatedly dropping a wet pellet individually from an 0.45 m height to a steel plate until a crack appeared on the surface of the tested pellet. The number of drops required to produce a crack on the surface of each pellet is the Drop Number.

The Wet Compressive Strength, also called green strength, was determined right after the pelletization and sieving from pellets in the size range 10-12.5 mm. The Wet Compressive Strength was measured by CT3 Texture Analyzer manufactured by Brookfield. The pellets were compressed at 10 mm/min until fracturing was observed and the peak compression force was measured. For the wet pellets, the analyzer also gave a value for the Deformation i.e. how many percentage the wet pellet can be compressed before it breaks. This value is an indication of plasticity of the wet pellet.

Visual observations were made on the green pellets. Pellets made with the Sample A binder had very good pellet surface properties—the surface of the pellets was relatively smooth and dry.

A number of pellets (10-12.5 mm in size) were then dried in 105° C. for 12 h. The Dry Compressive Strength was measured for the dried pellets by CT3 Texture Analyzer manufactured by Brookfield. The pellets were compressed at 10 mm/min until fracturing was observed and the peak compression force was measured and recorded.

The moisture content of the pellets was also measured and recorded. The wet pellets are put on a plate with known weight. The wet sieved pellets of certain sizes are placed on the plate, approximately 1 kg per plate. The combined weight is measured and pellets are placed in an 105° C. oven for 12 h. The combined weight of the dried pellets is measured, with the difference (wet-dried) being the evaporated moisture. The evaporated moisture is expressed as % moisture content in the wet green pellets after pelletization= (green pellet moisture).

The Compressive Strength of the sintered pellets was also measured. Sintered pellets were prepared by loading the dried pellets into the laboratory furnace and heating them (for approximately one hour) to a furnace temperature of 1200° C. or 1300° C. (as identified in Table 1), and holding the temperature 15 min before cooling down to room temperature. After cooling the compressive strength of the 10-12.5 mm sintered pellets were measured by INSTRON® 3366 compressive strength analyzer. The pellets were compressed at 10 mm/min until fracturing was observed and the peak compression force was measured. The values given in Table 1 are averages of 10 to 20 repeated tests.

TABLE 1

Physical properties of iron ore pellets.

| | | | Results | | | | | | |
| | | | | Dry | End | High Temp Strength | | | |
| Sample | Drop Number | Wet Strength (kg) | Deform (%) | Strength (kg) | Moisture (%) | 1200° C. | sd | 1300° C. | sd |
| --- | --- | --- | --- | --- | --- | --- | --- | --- | --- |
| Control | 10.2 | 0.94 | 7.5 | 2.289 | 9.18 | 124.9 | 28.3 | 396.8 | 73.8 |
| A | 10.4 | 0.76 | 10.4 | 2.342 | 9.09 | 162.0 | 31.4 | 446.9 | 95.4 |

The results showed that the binder composition in accordance with the exemplary embodiments gives a better dry strength than the control, i.e., 2.342 vs. 2.289. The results also show that the binder composition in accordance with the exemplary embodiments gives a better high temperature strength than the control, i.e., 162.0 vs. 124.9 at 1200° C. and 446.9 vs. 396.8 at 1300° C.

In the preceding specification, various exemplary embodiments have been described. It will, however, be evident that various modifications and changes may be made thereto, and additional embodiments may be implemented, without departing from the broader scope of the exemplary embodiments as set forth in the claims that follow. The specification and examples are accordingly to be regarded in an illustrative rather than restrictive sense.

We claim:

1. A binder composition for agglomerating iron ore fines comprising: one or more modified starches and one or more synthetic dry polymers wherein,
    (a) said one or more synthetic dry polymers has a net anionic charge of from 5 to 40 mole % charge;
    (b) said one or more modified starches is in a form of particles having a median size of 75 to 250 microns and said one or more synthetic dry polymers is in a form of particles having a median size of 75 to 800 microns; and
    (c) the one or more synthetic dry polymers has an average specific viscosity ranging from 2.5 to 6.5 cPs;
    (d) wherein said one or more synthetic dry polymers comprise a copolymer which consist of acrylamide and acrylic acid monomers.

2. The binder composition of claim 1, wherein the binder composition comprises:
    (a) about 5 to about 50% by weight of said one or more modified starches; and
    (b) about 50 to about 95% by weight of said one or more synthetic dry polymers.

3. The binder composition of claim 1, wherein the binder composition comprises: (a) about 20 to about 50% by weight of said one or more modified starches; and (b) about 50 to about 80% by weight of said one or more synthetic dry polymers.

4. The binder composition of claim 1, wherein said one or more modified starches is a gelled corn starch.

5. The binder composition of claim 4, wherein the binder composition comprises about 20% to about 50% by weight of said gelled corn starch and about 50% to about 80% by weight of said copolymer which consist of acrylamide and acrylic acid monomers, wherein at least about 80% by weight of said gelled corn starch and said copolymer which consist of acrylamide and acrylic acid monomers are present as particles having a size ratio in the range of about 1:1 to about 1:10.

6. The binder composition of claim 4, wherein the binder composition comprises about 20% to about 30% by weight of said gelled corn starch and about 70% to about 80% by weight of said copolymer which consist of acrylamide and acrylic acid monomers, and further wherein said gelled corn starch and said copolymer which consist of acrylamide and acrylic acid monomers are present as particles having a size ratio in the range of about 1:1 to about 1:1.15.

7. The binder composition of claim 1, wherein the binder composition further comprises one or more alkaline materials.

8. The binder composition of claim 1, wherein the net anionic charge of said one or more synthetic dry polymers which comprise a copolymer which consist of acrylamide and acrylic acid monomers is from about 5 to about 15 mole %.

9. The binder composition of claim 1, wherein the binder composition comprising of at least 25% by weight of said one or more modified starches.

10. The binder composition of claim 1, wherein the one or more synthetic dry polymers has an average specific viscosity ranging from 2.5 to 6.1 cPs, 2.5 to 3.5 cPs, or 4.5 to 6.1 cPs.

* * * * *